United States Patent
Yoshii et al.

(10) Patent No.: US 8,422,156 B2
(45) Date of Patent: Apr. 16, 2013

(54) ZOOM LENS BARREL

(75) Inventors: Manabu Yoshii, Yokohama (JP); Sayoko Okabe, Hachioji (JP); Koji Okano, Hachioji (JP)

(73) Assignee: Olympus Imaging Corp., Tokyo (JP)

( * ) Notice: Subject to any disclaimer, the term of this patent is extended or adjusted under 35 U.S.C. 154(b) by 213 days.

(21) Appl. No.: 12/917,933

(22) Filed: Nov. 2, 2010

(65) Prior Publication Data

US 2011/0102910 A1     May 5, 2011

(30) Foreign Application Priority Data

Nov. 5, 2009    (JP) ................. 2009-254306

(51) Int. Cl.
     *G02B 7/02*         (2006.01)
(52) U.S. Cl.
     USPC ............ 359/826; 359/700; 359/819; 359/822
(58) Field of Classification Search .......... 359/699–705, 359/819, 822, 826
     See application file for complete search history.

(56) References Cited

U.S. PATENT DOCUMENTS

| | | | | |
|---|---|---|---|---|
| 6,198,578 | B1 * | 3/2001 | Iwasa et al. | 359/699 |
| 2003/0234986 | A1 * | 12/2003 | Takagi et al. | 359/700 |

FOREIGN PATENT DOCUMENTS

| | | |
|---|---|---|
| JP | 2004-258636 | 9/2004 |
| JP | 2005-173413 | 6/2005 |

* cited by examiner

*Primary Examiner* — Thomas K Pham
*Assistant Examiner* — Vipin Patel
(74) *Attorney, Agent, or Firm* — John C. Pokotylo; Straub & Pokotylo

(57) ABSTRACT

A zoom lens barrel includes a fixed frame, a rotary frame, a moving frame that moves in an optical axis direction with the rotary frame, a float key that is restricted from rotating and moves, an inner cam frame that has a cam follower, is rotationally driven by the rotary frame, and moves in the optical axis direction, a guide frame that has a cam follower, and moves in the optical axis direction, an outer cam frame moves in the optical axis direction with the guide frame, and moves relatively with respect to the guide frame, a second group zoom frame that holds a second group lens, has a cam follower, is restricted from rotating around the optical axis, and moves in the optical axis direction, and a first group zoom frame that holds a first group lens, has a cam follower, and moves in the optical axis direction.

4 Claims, 16 Drawing Sheets

FIG.12
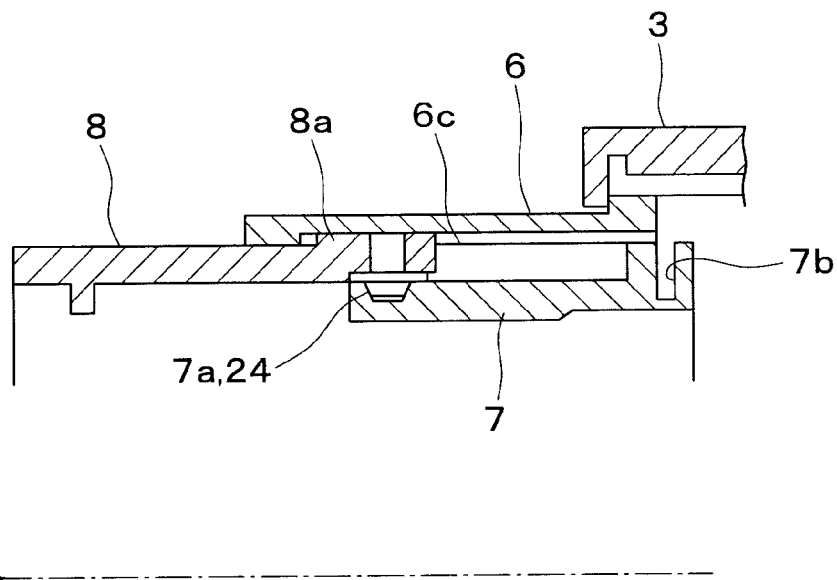
FIG.13
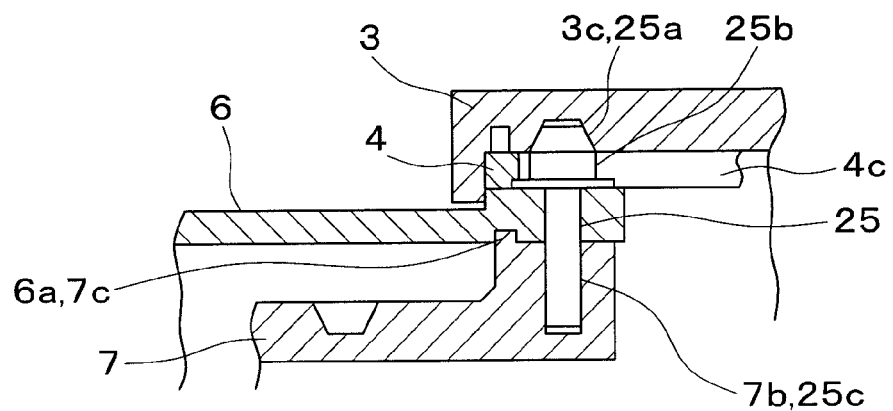

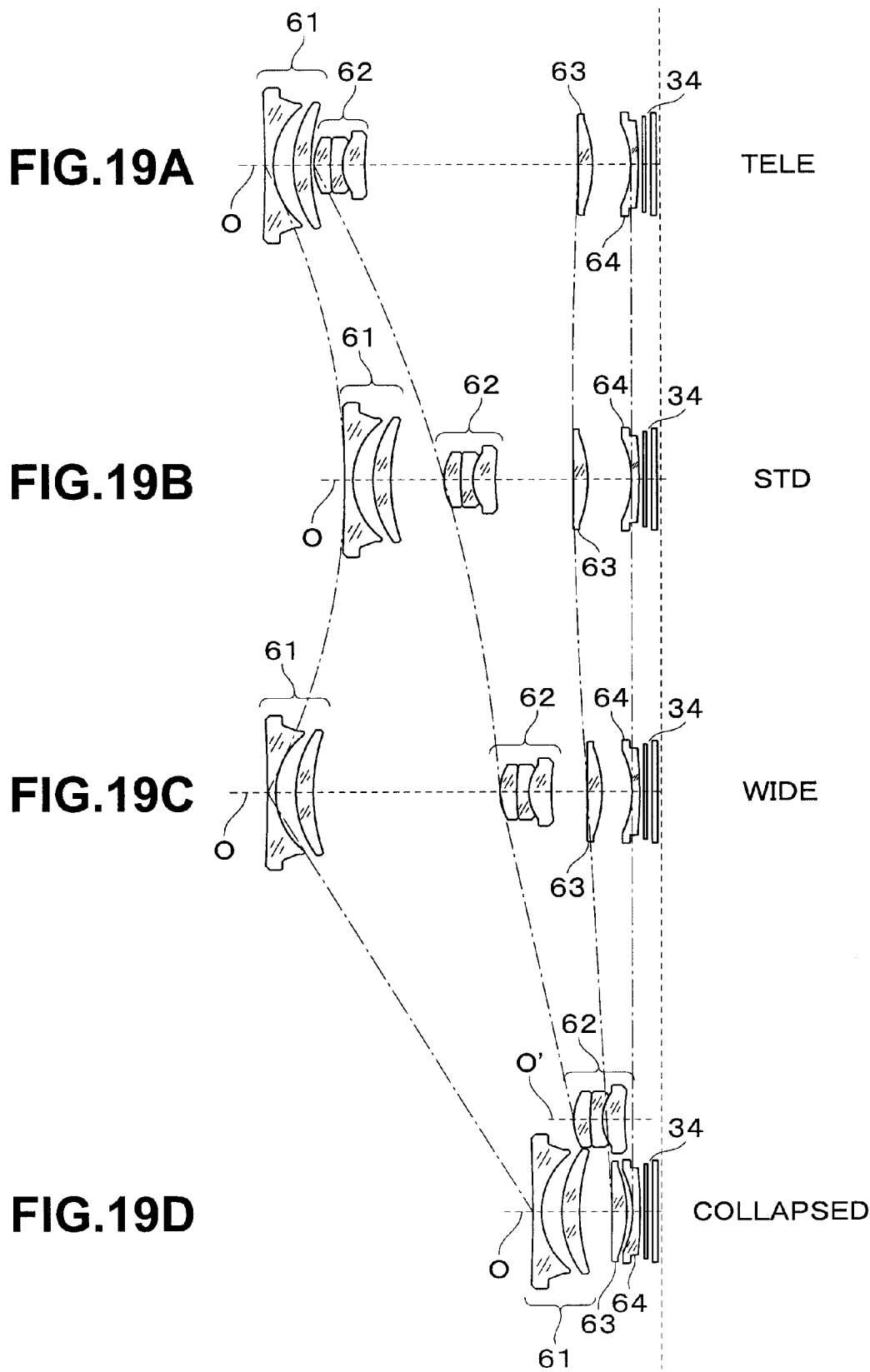

ZOOM LENS BARREL

CROSS REFERENCE TO RELATED APPLICATION

This application claims the benefit of Japanese Application No. 2009-254306 filed in Japan on Nov. 5, 2009, the contents of which are incorporated herein by this reference.

BACKGROUND OF THE INVENTION

1. Field of the Invention

The present invention relates to a zoom lens barrel, and more particularly, to a zoom lens barrel having an advanceable and retractable lens frame.

2. Description of the Related Art

In recent years, digital cameras have showed tendencies to be enhanced in performance and to be more compact and slimmer. Accordingly, in order to be adapted to the tendencies, the zoom lens barrels incorporated in the cameras are in such a state as to be desired to have high magnifications and shorter barrel lengths in the lens optical axis directions in the collapsed state. As the above described zoom lens barrel, for example, the one having an advanceable and retractable barrel structure formed by a plurality of stages is generally applied.

The above described zoom lens barrel includes a fixed frame placed at an outermost periphery, a plurality of movable frames which are fitted in an inner portion of the fixed frame by being superimposed thereon toward an inner peripheral side, and are advanceable and retractable in an optical axis direction, and a plurality of lens holding frames (lens frames) supported by an inner peripheral portion of any of the above described plurality of movable frames. The above described plurality of movable frames are provided with cam means formed by cam grooves and cam followers for frame advancing and retracting drive. The above described plurality of advancing and retracting frames are sequentially drawn out at the time of zooming, and the above described holding frames supported by the advancing and retracting frames at the inner peripheral side performs advancing and retracting movement in the optical axis direction. As the zoom lens barrel having such a configuration, there is the one disclosed by Japanese Patent Application Laid-Open Publication No. 2005-173413, for example.

SUMMARY OF THE INVENTION

The present invention includes a fixed frame, a rotary frame that rotates around an optical axis with respect to the fixed frame, a first rectilinearly moving member that is restricted from rotating around the optical axis with respect to the fixed frame, and moves in an optical axis direction with the rotary frame, a second rectilinearly moving member that is restricted from rotating around the optical axis by the first rectilinearly moving member, and moves in the optical axis direction, first cam means including the rotary frame and the first rectilinearly moving member, second cam means including the rotary frame and the first rectilinearly moving member, a first cam frame that has a first cam follower which engages with and slides in contact with the first cam means, rotates with the rotation of the rotary frame, and moves in the optical axis direction, third cam means including the second rectilinearly moving member and the first cam frame, a third rectilinearly moving member that has a second cam follower which engages with and slides in contact with the second cam means, is restricted from rotating around the optical axis, and moves in the optical axis direction, a second cam frame that is fitted on the first cam frame, is restricted from relatively rotating around the optical axis by the first cam frame, is movable in the optical axis direction with respect to the first cam frame, moves in the optical axis direction with the third rectilinearly moving member, and is provided rotatably with respect to the third rectilinearly moving member, rotation transmitting means that transmits rotation of the first cam frame to the second cam frame, a first lens frame that holds a first lens which is a part forming a zoom lens system, has a third cam follower which engages with and slides in contact with the third cam means, is restricted from rotating around the optical axis by the second rectilinearly moving member, and moves in the optical axis direction with rotation of the first cam frame, fourth cam means configured by the third rectilinearly moving member and the second cam frame, and a second lens frame that holds another second lens different from the first lens of the zoom lens system, has a fourth cam follower which engages with and slides in contact with the fourth cam means, and moves in the optical axis direction with rotation of the second cam frame.

The advantages of the invention will become more apparent from the following detailed description.

BRIEF DESCRIPTION OF THE DRAWINGS

FIG. 12 is an enlarged vertical sectional view showing an engaging state of a rotary frame, a guide frame, and a first group zoom frame and an outer cam frame in the zoom lens barrel of FIG. 1;

FIG. 13 is an enlarged vertical sectional view showing an engaging state of the rotary frame, a moving frame, and the guide frame and the outer cam frame in the zoom lens barrel of FIG. 1;

FIG. 19A is a view showing an arrangement of a first to a fourth lens groups when the zoom lens barrel of FIG. 1 is in a telescopic state;

FIG. 19B is a view showing the arrangement of the first to the fourth lens groups when the zoom lens barrel of FIG. 1 is in a standard state;

FIG. 19C is a view showing the arrangement of the first to the fourth lens groups when the zoom lens barrel of FIG. 1 is in a wide end state; and FIG. 19D is a view showing the arrangement of the first to the fourth lens groups when the zoom lens barrel of FIG. 1 is in a collapsed state.

DETAILED DESCRIPTION OF THE PREFERRED EMBODIMENTS

A zoom lens barrel 1 that is one embodiment of the present invention is incorporated in, for example, a digital camera or the like, and is a collapsible type zoom lens barrel which is configured to be displaceable to a position of a photographing state capable of photographing in which each barrel is drawn out along the direction of the optical axis of the photographing optical system, and a position of a collapsed state which is a non-photographing state, in which the above described barrel is drawn in and housed inside a fixed frame.

In the following description, an optical axis of a photographing optical system in the zoom lens barrel 1 is set as an optical axis O.

Further, in the direction along the optical axis O, a subject side is set as a front, and an image forming side (namely, an image pickup device side) is set as a rear. A direction in which each barrel moves forward in the zoom lens barrel 1 is set as a drawing-out direction, and a rotating direction of each barrel is shown by the rotating direction seen from the front side. Further, a lateral direction is shown by the direction seen from the front side.

Figure 1:
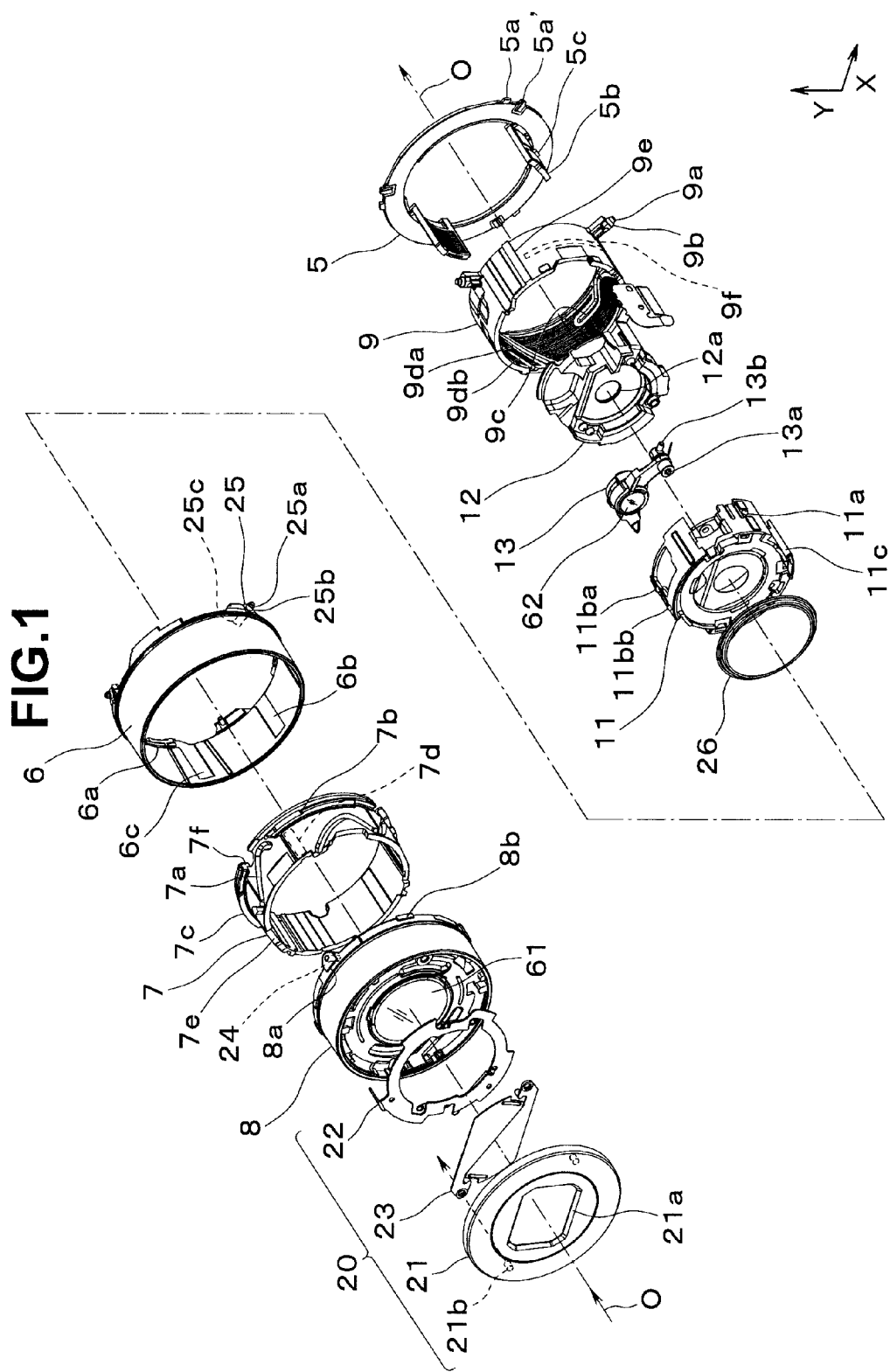
FIG. 1 is an exploded perspective view showing a part of a zoom lens barrel of one embodiment of the present invention.
Figure 2:
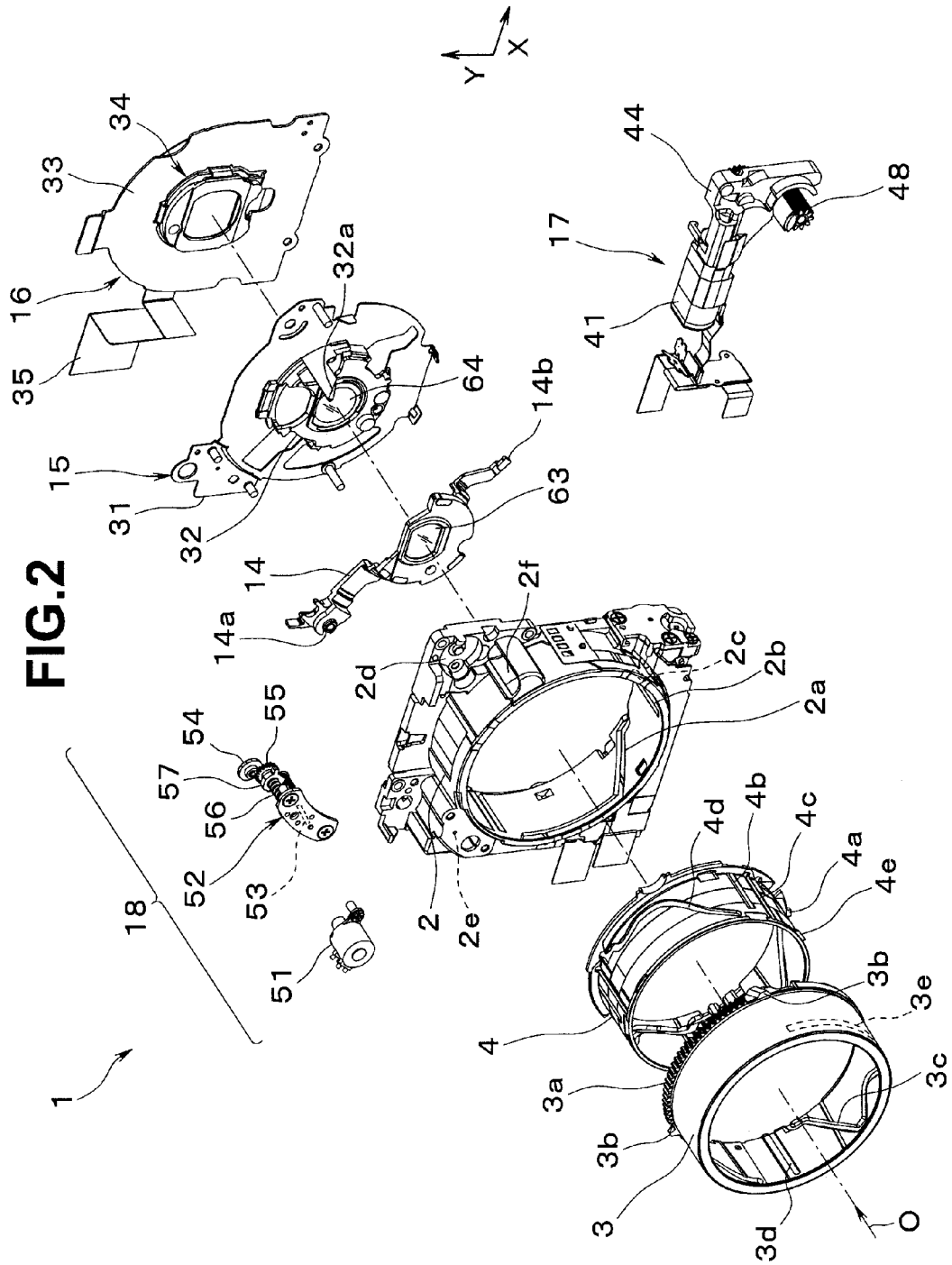
FIG. 2 is an exploded perspective view showing another part of the zoom lens barrel of FIG. 1.

As shown in FIGS. 1 and 2, the zoom lens barrel 1 includes a fixed frame 2 which is fixed to the camera main body, a rotary frame 3 which is supported by the fixed frame 2, rotationally, and advanceably and retractably driven, and includes first cam means and second cam means, a moving frame 4 that is a first rectilinearly moving frame which advances and retracts in the direction of the optical axis O with the rotary frame 3 in a rotation restricted (namely, rotation inhibited) state, and includes the first and the second cam means, an inner cam frame 9 that is a first cam frame which rotates with the rotary frame 3, performs advancing and retracting movement in the direction of the optical axis O, and includes third cam means, a float key 5 that is a second rectilinearly moving frame which performs advancing and retracting movement in the direction of the optical axis O with the inner cam frame 9 in the rotation restricted state, and includes the third cam means, a second group zoom frame 11 that is a first lens frame which supports therein a second group frame 13 and a shutter frame 12, and performs advancing and retracting movement in the direction of the optical axis O in the rotation restricted state, a guide frame 6 that is a third rectilinearly moving frame which performs advancing and retracting movement in the direction of the optical axis O in the rotation restricted state, and includes fourth cam means, an outer cam frame 7 that is a second cam frame which performs advancing and retracting movement in the direction of the optical axis O with the guide frame 6 in the rotation restricted state, and includes the fourth cam means, a first group zoom frame 8 that is a second lens frame which performs advancing and retracting movement in the direction of the optical axis O in the rotation restricted state, a first group cap unit 20 which contains a lens barrier, a third group frame 14 that is a focus lens frame which is driven to advance and retract in the optical axis direction at a focusing time and a collapsing operation time, a fourth group frame unit 15 which is fixedly supported by a rear surface portion of the fixed frame 2, and an image pickup unit 16 which is fixedly supported on a rear surface side of the fourth group frame unit 15. The zoom lens barrel 1 further includes a zoom drive unit 17 and a focus drive unit 18 as a barrel drive section, and a first group lens 61 that is a second lens of a zoom lens system held by the first group zoom frame 8, a second group lens 62 that is a first lens of the zoom lens system held by the second group frame 13, a third group lens 63 that is a focus lens held by the third group frame 14, a fourth group lens 64 held by a fourth group frame 32, a shutter blade 65 held by the shutter frame 12, and a shutter actuator 66, as a photographing optical system.

Figure 14:
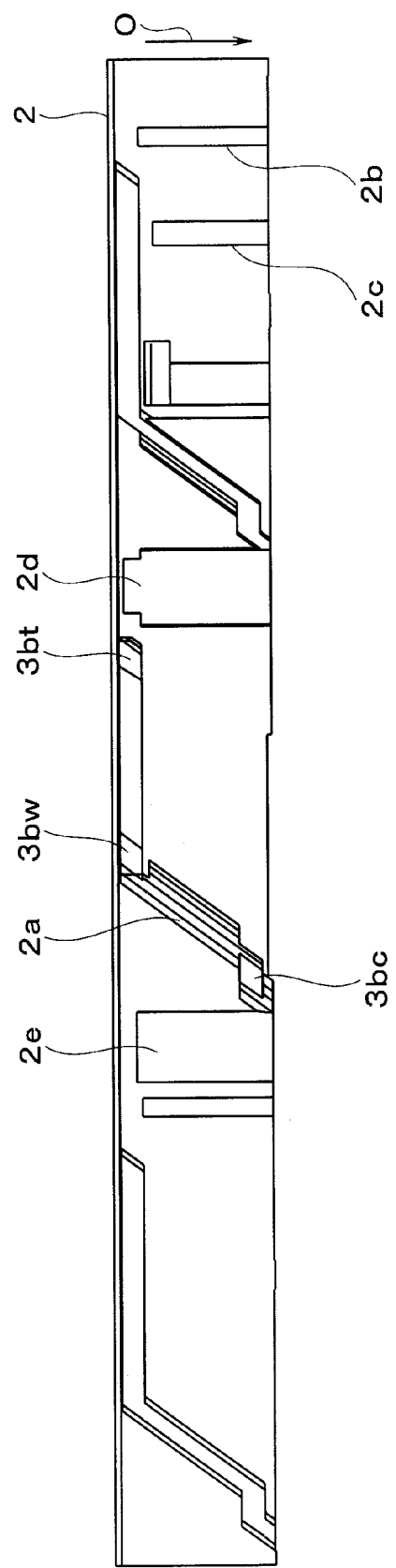
FIG. 14 is a development of a fixed frame inner peripheral surface in the zoom lens barrel of FIG. 1.

The fixed frame 2 has a cylinder inner peripheral portion, and in the inner peripheral portion, has a cam groove 2a in which an inclined cam groove portion inclined relative to the optical axis O, and a circumferential groove portion formed along a circumference are connected, and a rectilinearly moving groove 2b formed in the direction along the optical axis O (FIG. 14).

Further, the zoom drive unit 17 for performing zooming drive of the photographing optical system is placed in a unit housing section 2d at an upper right portion of the outer periphery of the fixed frame 2, and the focus drive unit 18 for performing focusing drive of the photographing optical system is placed in a unit housing section 2e at an upper left portion of the outer periphery.

Figure 3:
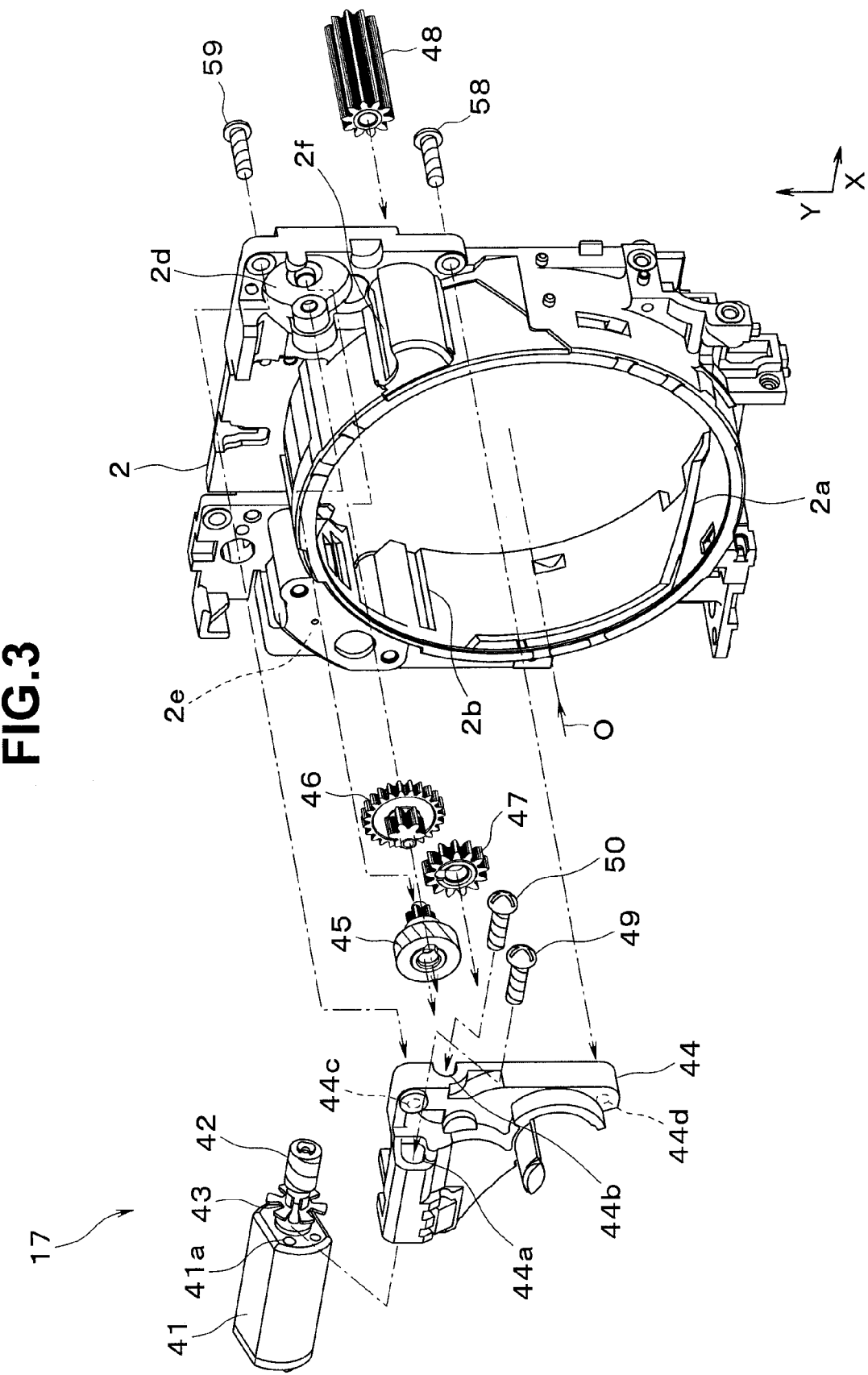
FIG. 3 is an exploded perspective view of a fixed frame and a zoom drive unit applied to the zoom lens barrel of FIG. 1.

The zoom drive unit 17 includes a gear case 44, a zoom motor 41 as a zoom drive actuator, a worm wheel (worm gear) 45, gears 46 and 47, and a long gear 48 as shown in FIG. 3. A worm (worm gear) 42 and a slit plate 43 having six blades 43c for detecting a motor rotational amount are fixed to an output shaft 41c of the zoom motor 41.

Figure 6:
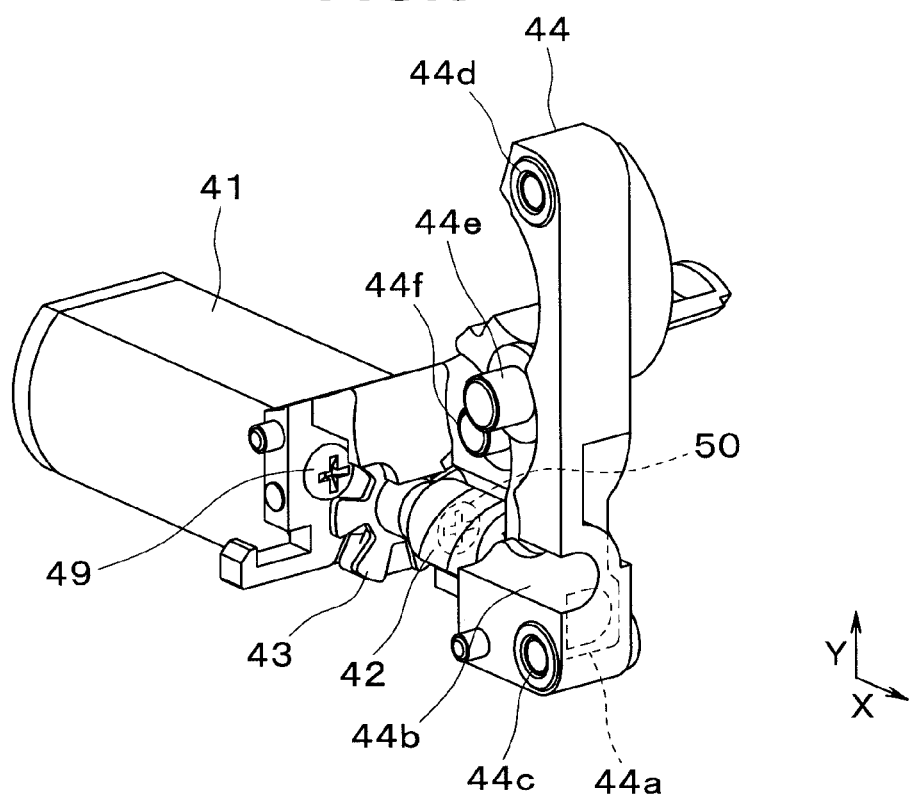
FIG. 6 is a perspective view of a state in which a gear box is attached to the zoom motor of FIG. 4.

The zoom drive unit 17 is assembled to the gear case 44 as shown in FIG. 6, and thereafter, the gear case 44 is fitted in the unit housing section 2d of the fixed frame 2.

Figure 4:
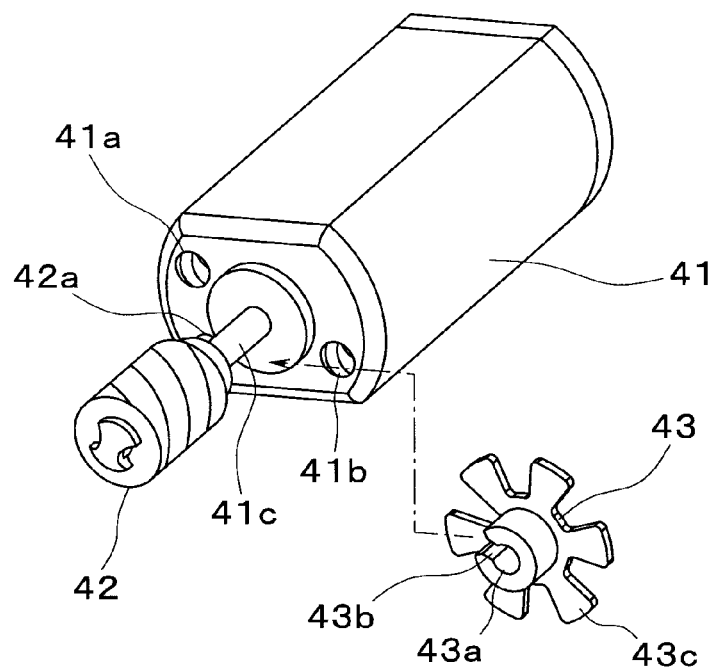
FIG. 4 is an exploded perspective view of a zoom motor and a slit plate applied to the zoom lens barrel of FIG. 1.
Figure 5:
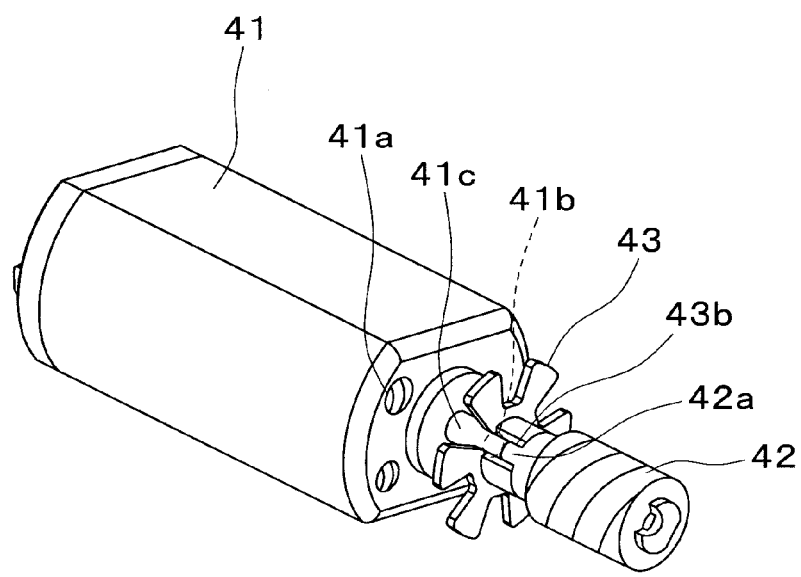
FIG. 5 is a perspective view of a state in which a slit plate is press-fitted and fixed to the zoom motor of FIG. 4.
Figure 7:
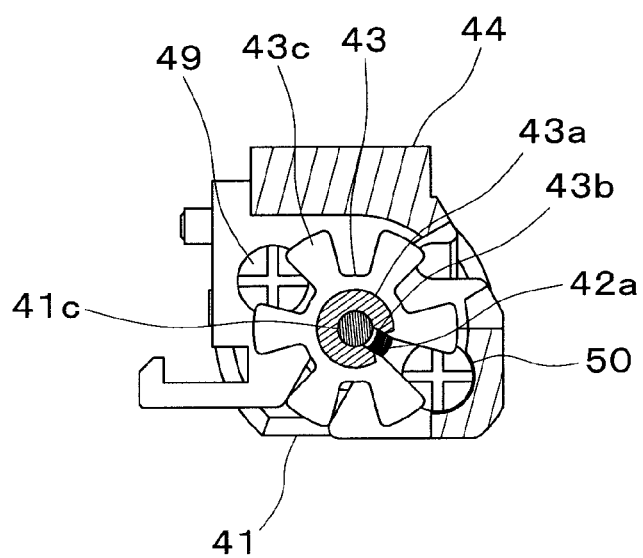
FIG. 7 is a front view of the state in which the gear box is attached to the zoom motor of FIG. 4.

When the zoom motor 41 is attached to the gear case 44 as shown in FIG. 6, screws 49 and 50 are inserted into screw holes 41a and 41b on the front surface portion of the motor main body, and are fastened with a driver (not illustrated) inserted through gear driver insertion holes 44b and 44a (FIGS. 4 and 6). At this time, in the state in which the slit plate 43 as well as the worm 42 are attached to the output shaft 41c of the zoom motor 41, the blades 43c of the slit plate 43 interfere with driver insertion at the time of fastening the screws. Especially when the number of blades 43 is large, the screw-fastening operation becomes difficult. In the present embodiment, the number of blades is six (FIG. 7).

Thus, in the present embodiment, as the slit plate 43, the slit plate which is provided with a cutout portion 43b at a side of a shaft hole 43a is applied as shown in FIG. 4. The zoom motor 41 is first attached to the gear case 44 by the screws 49 and 50 with only the worm 42 fixed to the output shaft 41c.

Thereafter, the slit plate 43 is inserted from the side of the output shaft 41c at the motor main body side of the worm 42 through the cutout portion 43b, and press-fitted (FIG. 6). More specifically, the cutout space in the cutout portion 43b, which is smaller than the diameter of the output shaft 41c of the motor is forcefully expanded, and the slit plate 43 is fitted. The output shaft 41c of the motor and the slit plate 43 are fitted to each other by so-called elastic fitness. The end portion at the motor main body side of the worm 42 is provided with a locking projection 42a for whirl stop which is engaged with the cutout portion 43b of the slit plate 43. As a result, the output shaft 41c, the worm 42 and the slit plate 43 are brought into an integrally rotatable state.

The gear case 44 in which the zoom motor 41, the gear 46 and the like are incorporated is fixed to the unit housing section 2d of the fixed frame 2 by screws 58 and 59 inserted through screw insertion holes 44c and 44d of the gear case 44, through screw insertion holes of the fixed frame 2. The long gear 48 is inserted into a long gear housing chamber 2f in a state in which the long gear 48 is meshed with the gear 47.

Rotation of the zoom motor 41 in the aforementioned zoom drive unit 17 is transmitted to the long gear 48 from the worm 42 through the worm wheel 45 and the gears 46 and 47.

The focus drive unit 18 includes a focus motor 51 as a focus drive actuator, a unit support plate 52, a feed screw 56 and a guide shaft 53 which are supported by the unit support plate 52, gears 54 and 55, and a nut 57 screwed onto the feed screw 56.

The focus drive unit 18 is incorporated in the unit housing section 2e of the fixed frame 2. Rotation of the focus motor 51 is transmitted to the feed screw 56 through the gears 54 and 55, and the nut 57 performs advancing and retracting movement along the direction of the optical axis O by rotation of the feed screw 56.

The third group frame 14 holds the third group lens 63, and is housed at the rear side of the inner peripheral portion of the fixed frame 2. The third group frame 14 has a guide shaft hole 14a in which the guide shaft 53 of the focus drive unit 18 is slidably fitted, and a guide projection portion 14b which is slidably engaged in the rectilinearly moving groove 2c of the fixed frame 2.

The third group frame 14 is supported to be advanceable and retractable in the direction of the optical axis O by the guide shaft 53 and the rectilinearly moving groove 2c, and is driven to advance and retract in the direction of the optical axis O by the focus drive unit 18 via the nut 57 at the time of focusing.

The fourth group frame unit 15 includes a fourth group frame bottom plate 31, and a fourth group frame 32 which is fixed to a front surface portion of the bottom plate 31 and holds the fourth group lens 64. The fourth group frame bottom plate 31 is fixed to a rear end surface of the fixed frame 2 by a screw.

The image pickup unit 16 includes an image pickup unit bottom plate 33, an image pickup device unit 34 including a protection glass, an optical system filter, an image pickup device and the like, and a connecting flexible circuit board 35. The image pickup unit bottom plate 33 is fixed in a state overlaid onto a rear surface of the fourth group frame bottom plate 31 at a rear side of the fixed frame 2.

The rotary frame 3 is a cylindrical frame member with both ends opened in the direction of the optical axis O, and the cylinder section outer periphery of the rotary frame 3 is fitted in the cylinder section inner periphery of the fixed frame 2 in the rotatable, and advanceable and retractable state. At the rear portion of the outer periphery of the rotary frame 3, a cam follower 3b which is slidably fitted in the cam groove 2a of the fixed frame 2 and a gear section 3a meshed with the long gear 48 are formed.

Figure 16:
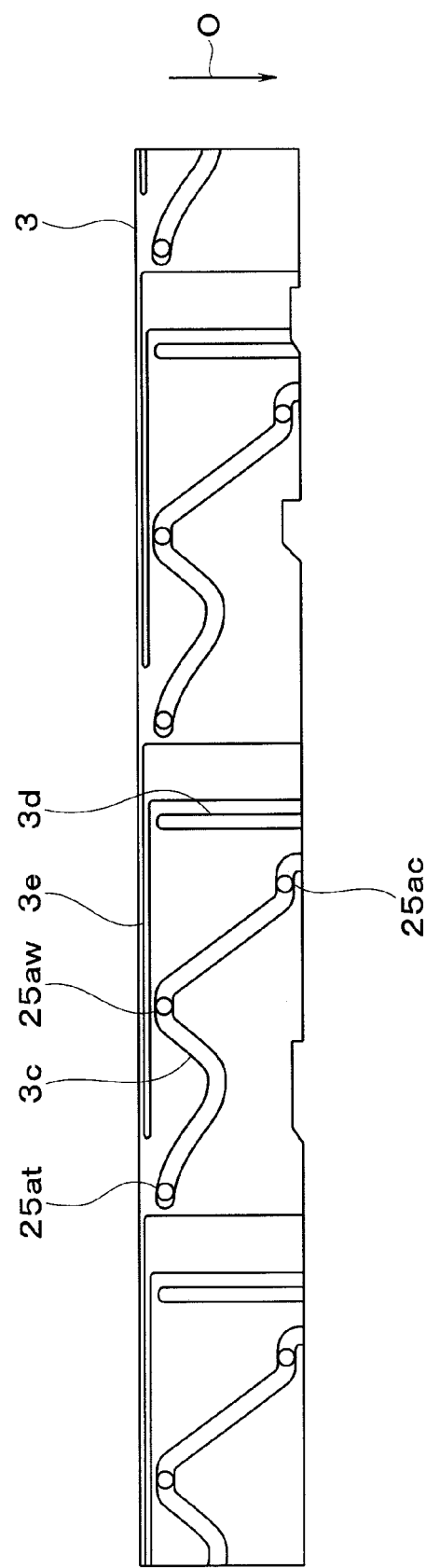
FIG. 16 is a development of a rotary frame inner peripheral surface in the zoom lens barrel of FIG. 1.

A cam groove 3c that is a first cam groove (second cam means) which is inclined relative to the optical axis O, and a rectilinearly moving groove 3d that is a first rectilinearly moving groove (first cam means) formed in the direction along the optical axis O are provided in the inner peripheral portion of the rotary frame 3, and a circumferential groove 3e along the circumferential direction is provided in a front end portion of the inner periphery of the rotary frame 3 (FIG. 16).

When the zoom lens barrel 1 is set up to the photographing state from the collapsed state, the long gear 48 is rotationally driven by the zoom motor 41. The rotary frame 3 is rotationally driven through the gear section 3a, and is drawn out toward the front from the collapsed position via the cam follower 3b by the cam groove 2a to reach the wide position in the photographing state. Thereafter, when the long gear 48 is further rotationally driven in the same direction, the cam follower 3b moves along the circumferential direction on the cam groove 2a, and the rotary frame 3 rotationally moves to the telescopic position without advancing or retracting in the direction of the optical axis O.

As shown in FIG. 14, the cam follower 3b moves to cam follower relative positions 3bc, 3bw and 3bt on the cam groove 2a of the rotary frame 3 when the zoom lens barrel 1 is switched to the collapsed state, the wide state and the telescopic state.

Figure 15:
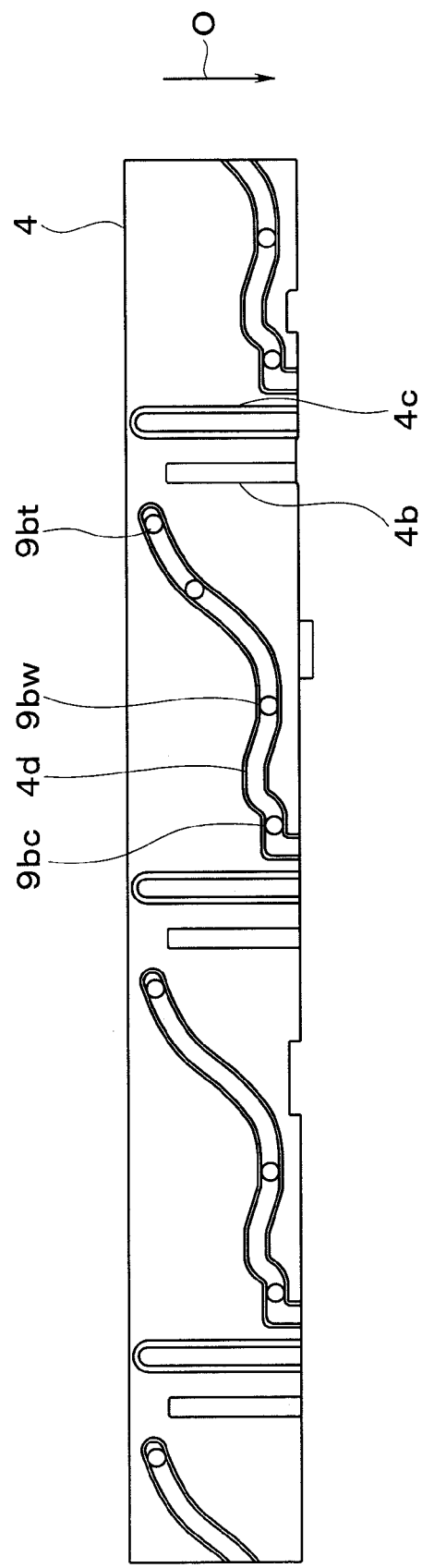
FIG. 15 is a development of a moving frame inner peripheral surface in the zoom lens barrel of FIG. 1.

The moving frame 4 is a cylindrical frame member with both ends opened in the direction of the optical axis O, and the cylinder section outer periphery of the moving frame 4 is fitted in the cylinder section inner periphery of the rotary frame 3 to be relatively rotatable and in a rotation restricted (rotation inhibited) state. At the outer peripheral portion of the rear end of the moving frame 4, a guide projection portion 4a which slidably engages with the rectilinearly moving groove 2b of the fixed frame 2 and is provided to project outward, and a projection portion 4e which is along the outer peripheral portion of the front end portion and slidably engages with the circumferential groove 3e of the rotary frame 3 are provided, and at the circumferential cylinder section, a cam groove 4d which is a groove which penetrates through the inner and outer peripheries, and is a second cam groove (first cam means) inclined in the direction of the optical axis O, and rectilinearly moving grooves 4b and 4c which are second rectilinearly moving grooves (second cam means) along the direction of the optical axis O are provided (FIG. 15).

The moving frame 4 is restricted (inhibited from rotating) from rotating by the rectilinearly moving groove 2b of the fixed frame 2, and is bayonet-coupled to the rotary frame 3 in a relatively rotatable state by the projection portion 4e and the circumferential groove 3e. Accordingly, when the rotary frame 3 rotates and advances and retracts, the moving frame 4 performs advancing and retracting movement in the optical axis direction with the rotary frame 3 in the rotation restricted state.

Figure 18:
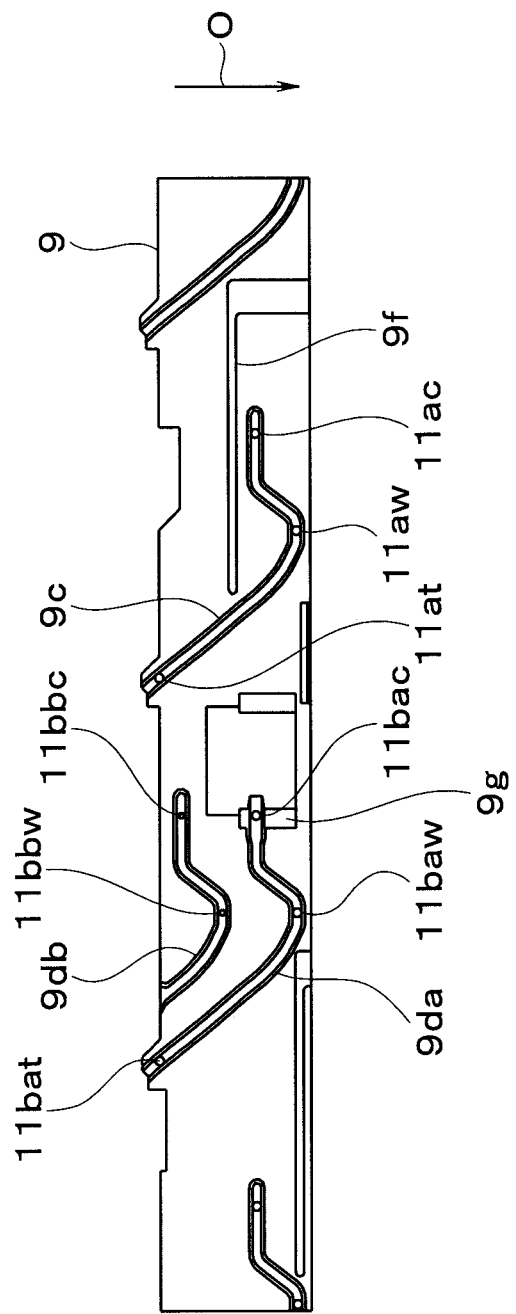
FIG. 18 is a development of an inner cam frame inner peripheral surface in the zoom lens barrel of FIG. 1.

The inner cam frame 9 is a frame member in a cylindrical shape with both ends opened in the direction of the optical axis O, is fitted in the inner peripheral portion of the outer cam frame 7, rotates together (in the state in which relative rotation is restricted), with both ends opened in the direction of the optical axis O, and advances and retreats in the direction of the optical axis O. The inner cam frame 9 has a cam follower 9b that is a first cam follower provided at an outer peripheral rear portion to project outward, a guide projection 9a integrally provided at an outer distal end of the cam follower, and a rectilinearly moving guide projection 9e in a linear shape that is rotation transmitting means along the direction of the optical axis O at the outer peripheral portion. Further, the inner peripheral portion of the inner cam frame 9 is provided with two cam grooves 9c as third cam grooves (third cam means) inclined with respect to the optical axis O, and a pair of cam grooves 9da and 9db, a circumferential groove 9f along the circumferential direction, and a relief section 9g at the time of the second group frame 13 being rotated into the retract position (FIG. 18).

The cam follower 9b of the inner cam frame 9 slidably engages with the cam groove 4d of the moving frame 4, and the guide projection 9a inserted through the cam groove 4d of the moving frame 4, and slidably engages with the rectilinearly moving groove 3d of the rotary frame 3. Accordingly, the inner cam frame 9 advances and retracts in the direction of the optical axis O relatively to the moving frame 4 while rotating with the rotary frame 3.

As shown in FIG. 15, when the zoom lens barrel 1 is switched to the collapsed state, the wide state and the telescopic state, the cam follower 9b moves to the cam follower relative positions 9bc, 9bw and 9bt on the cam groove 4d of the moving frame 4.

The float key 5 is a frame member formed into a disk shape having an opening in a center, the disk-shaped portion is fitted in the moving frame 4, and advances and retreats in the direction of the optical axis O in the rotation restricted state. The float key 5 is provided with a guide projection portion 5a projected to the outside of the disk-shaped portion, a projection portion 5a' which is paired with the guide projection portion 5a and projects at the disk-shaped outer periphery, two rectilinearly moving guides 5b in straight line shapes that are third cam means projected forward along the direction of the optical axis O, and a projection 5c which is projected to an outer peripheral side at the outer peripheral portion of the rectilinearly moving guide 5b. A light shielding plate is pasted on the disk-shaped portion of the float key 5.

The guide projection portion 5a of the float key 5 slidably engages with the rectilinearly moving groove 4b of the moving frame 4. Further, the projection portion 5a' is gently fitted on the rectilinearly moving groove 4c of the moving frame 4, and shields an unwanted light entering from the rectilinearly moving groove 4c from the front of the barrel frame to a certain degree. The rectilinearly moving guide 5b penetrates through the inner peripheral portion of the inner cam frame 9, and the projection 5c on the rectilinearly moving guide 5b slidably engages with the circumferential groove 9f of the inner cam frame 9 in the penetrated state. Accordingly, the float key 5 advances and retracts in the direction of the optical axis O in the state integrated with the inner cam frame 9 while being restricted from rotating by the moving frame 4.

The second group zoom frame 11 is formed of a cylindrical frame member, and its outer peripheral portion is fitted in the inner peripheral portion of the inner cam frame 9 to be relatively rotatable. Inside the second group zoom frame 11, the second group frame 13 is advanceable and retractable perpendicularly to the photographing optical path, and is supported in the rotatable state at the advance position and retract position, and further, the shutter frame 12 is supported in the state urged by a spring toward the rear side in the advanceable and retractable state in the direction of the optical axis O, behind the second group frame 13.

On the left and the right of the outer peripheral portion of the second group zoom frame 11, a rectilinearly moving groove 11c along the direction of the optical axis O, two cam followers 11a as third cam followers, and a paired two cam followers 11ba and 11bb, which are arranged along the direction of the optical axis O, are provided. Further, at the inner peripheral portion, a support shaft (not illustrated) which rotatably supports the second group frame 13 and is parallel with the optical axis O is provided.

The rectilinearly moving guide 5b of the float key 5 is slidably inserted through the rectilinearly moving groove 11c, the cam follower 11a engages with the cam groove 9c of the inner cam frame 9, and the cam followers 11ba and 11bb are engaged with the cam grooves 9da and 9db, whereby the second group zoom frame 11 is fitted in the inner peripheral portion of the inner cam frame 9. Accordingly, the second group zoom frame 11 advances and retracts in the direction of the optical axis O by the moving amount that is the result of the moving amount by the cam grooves 9c and 9da being added to the respective relative moving amounts of the moving frame 4 and the inner cam frame 9, with rotation and advancing and retracting movement of the inner cam frame 9 in the state in which the second group zoom frame 11 is restricted from rotating (inhibited from rotation) by the float key 5.

Among the paired cam grooves 9da and 9db, the cam groove 9da engages with the cam follower 11ba from a wide cam follower relative position 11baw to a telescopic cam follower relative position 11bat without a backlash as shown in FIG. 18 when the zoom lens barrel 1 is in the wide state to the telescopic state, but when the zoom lens barrel 1 is in the collapsed state, or in the vicinity of the collapsed state, the cam groove 9da reaches the region of the relief section 9g, and therefore, is in the non-engaging state in which position restriction is not performed at a collapsed cam follower relative position 11bac, that is, a free state. However, the cam groove 9db is engaged without a backlash in a cam follower relative position 11bbc corresponding to collapse and in the vicinity of the cam follower relative position 11bbc, whereby the second group frame 11 which is in the collapsed state is kept in the state without a backlash. The cam groove 9db is engaged with the cam follower 11bb with a backlash in the regions other than that for the collapsed state. The cam groove 9c is engaged with the cam follower 11a without a backlash in the cam follower relative positions 11ac, 11aw and 11at all the regions of the collapsed, wide and telescopic states.

A compression coil spring 26 is inserted in a space from the first group zoom frame 8 at a front end surface of the second group zoom frame 11, so that the second group zoom frame 11 is urged backward and the first group zoom frame 8 is urged forward, respectively, and therefore, backlashes are removed, which are between the cam followers 11a, 11ba, 11bb and the cam follower 24 and the respective cam grooves in which these cam followers are engaged.

The guide frame 6 is formed by a cylindrical frame member with both ends opened in the direction of the optical axis O, and the cylinder section of the guide frame 6 is fitted in the inner peripheral side of the cylinder section of the moving frame 4. A pin member 25 which penetrates through the inner periphery from the rear end outer peripheral portion of the guide frame 6 is press-fitted in and fixed to the guide frame 6. At the inner peripheral portion of the guide frame 6, rectilinearly moving grooves 6c and 6b which are third rectilinearly moving grooves (fourth cam means) along the direction of the optical axis O, and a circumferential groove 6a along the circumferential direction of the rear end portion are provided.

In the pin member 25 which is press-fitted in the rear end portion of the guide frame 6, a guide pin section 25c projected to the inner peripheral side of the guide frame 6, a guide pin section 25b which is projected to the outer peripheral side, and a cam follower 25a which is the second cam follower formed at a distal end portion of the guide pin section 25b are formed.

The outer cam frame 7 is formed by a cylindrical frame member with both ends opened in the direction of the optical axis O, the outer peripheral rear end of the cylinder section is located at the rear end portion in the cylinder section of the guide frame 6, and the outer peripheral portion of the cylinder section is fitted and inserted in the inner peripheral portion of the first group zoom frame 8, and further, the outer peripheral portion of the cylinder section of the inner cam frame 9 is fitted in the inner peripheral portion of the cylinder section of the outer cam frame 7. The outer cam frame 7 is provided with a circumferential groove 7b and a projection portion 7c on an outer peripheral portion at a rear end, a cam groove 7a that is a fourth cam groove (fourth cam means) which is inclined with respect to the direction of the optical axis O, on the outer peripheral portion, and a rectilinearly moving groove 7d which is rotation transmitting means along the direction of the optical axis O, on an inner peripheral portion. A rectilinearly moving guide projection 9e of the inner cam frame 9 is slidably engaged with the rectilinearly moving groove 7d of the outer cam frame 7, and the outer cam frame 7 is rotatably supported together with the inner cam frame 9, that is, the outer cam frame 7 and the inner cam frame 9 are supported with relative rotation being restricted. The outer cam frame 7 is provided with an abutment inclined surface 7e, which abuts on a driven arm provided at a barrier ring 22, at a front end surface in the direction of the optical axis O, in order to drive a barrier blade 23 in the closing direction at the time of collapse. Further, at a rear side end surface of the outer frame 7, a notch 7f for avoiding interference with a leg section extending in the outside diameter direction having the cam followers 9a and 9b of the inner cam frame 9 is provided.

The pin member 25 is press-fitted into a pin hole at the rear end of the guide frame 6 from the outer peripheral side, and has a guide pin section 25c penetrated through the guide frame 6. The penetrated guide pin section 25c is slidably engaged with the circumferential groove 7b of the outer cam frame 7. Further, a guide pin section 25b and a cam follower 25a at the projected portion to the outward side of the guide frame 6, of the pin member 25 press-fitted in the guide frame 6 are slidably engaged with the rectilinearly moving groove 4c of the moving frame 4 and the cam groove 3c of the rotary frame 3, respectively.

The first group zoom frame 8 is formed by a cylindrical frame member, the outer periphery of the cylinder section is fitted in the inner peripheral portion of the guide frame 6, and the outer cam frame 7 is fitted in the inner peripheral portion of the first group zoom frame 8. A cam follower 24 which is a fourth cam follower projected to the inner peripheral side is press-fitted in and fixed to a rear end of the first group zoom frame 8, a projection portion 8a, with the cam follower 24 being press-fitted, which projects to the outside diameter direction is provided at the rear end. Further, another projection portion 8b which is projected in the outside diameter direction is provided at the same outer peripheral rear end portion.

The first group zoom frame 8 is fitted to the outer periphery of the outer cam frame 7 with the cam follower 24 engaged with the cam groove 7a of the outer cam frame 7. The first group zoom frame 8 and the outer cam frame 7 are fitted in the inner peripheral portion of the guide frame 6 in the state in which the projection portions 8a and 8b of the first group zoom frame 8 are engaged with the inner peripheral side rectilinearly moving grooves 6c and 6b of the guide frame 6, and the projection portion 7c of the outer cam frame 7 is engaged with the circumferential groove 6a of the guide frame 6.

Accordingly, the guide frame 6 and the first group zoom frame 8 are supported to be capable of advancing and retracting movement in the direction of the optical axis O in the rotation restricted (rotation inhibited) state by the moving frame 4, and the outer cam frame 7 is supported to move in the direction of the optical axis O integrally with the guide frame 6, and is rotationally driven together with the inner cam frame 9 by the rotary frame 3. When the guide frame 6 is driven to advance, retract and rotate by the rotary frame 3, the first group zoom frame 8 advances and retracts in the direction of the optical axis O by the moving amount which is the result of the moving amount by the cam groove 7a being added to the respective relative moving amounts of the rotary frame 3 and the guide frame 6.

As shown in FIG. 16, the cam follower 25a of the guide frame 6 moves to the cam follower relative positions 25ac, 25aw and 25 at on the cam groove 3c of the rotary frame 3 when the zoom lens barrel 1 is in the collapsed state, the wide state and the telescopic state.

Figure 17:
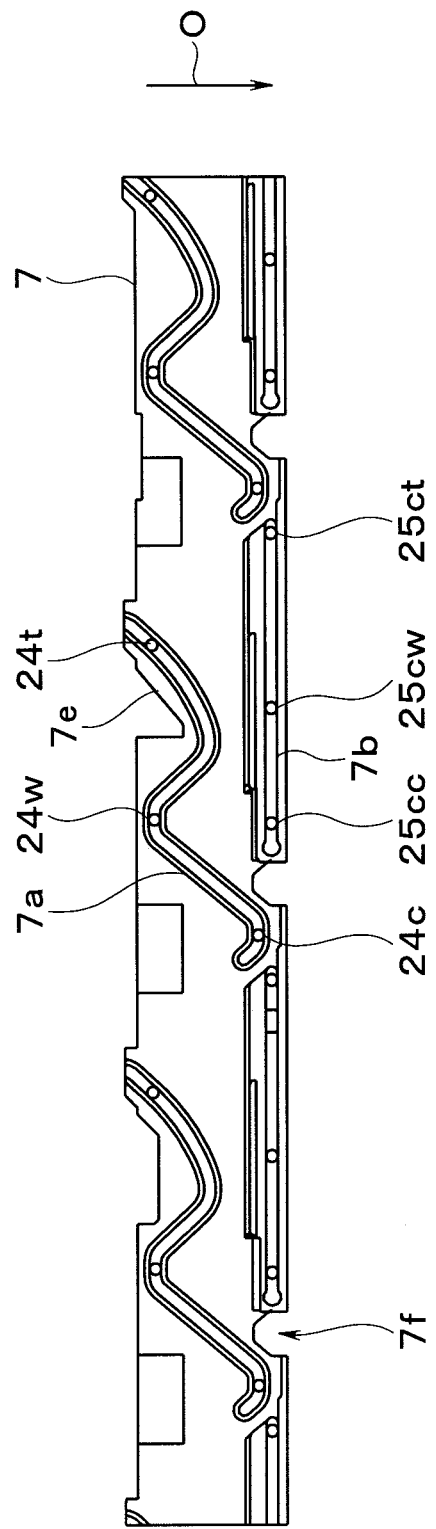
FIG. 17 is a development of an outer cam frame outer peripheral surface in the zoom lens barrel of FIG. 1.

Further, as shown in FIG. 17, the cam follower 24 of the first group zoom frame 8 moves to the cam follower relative positions 24c, 24w and 24t with respect to the cam groove 7a of the outer cam frame 7 in the collapsed state, the wide state and the telescopic state of the zoom lens barrel 1. Further, the guide pin section 25c of the guide frame 6 moves to guide pin section relative positions 25cc, 25cw and 25ct on the circumferential groove 7b of the outer cam frame 7 in the collapsed state, the wide state and the telescopic state of the zoom lens barrel 1.

The first group cap unit 20 is formed by a first group cap 21, the barrier ring 22, the barrier blade 23 and a barrier urging spring (not illustrated).

The first group cap 21 has a central opening section 21a which is opened and closed by the barrier blade 23, and is fitted to a front side portion of the first group zoom frame 8. The barrier ring 22 is supported at the front surface of the first group zoom frame 8 to be rotatable around the optical axis O, and opens and closes the barrier blade 23 by being linked to the rotation of the outer cam frame 7. The barrier blade 23 is formed by a pair of barrier blades rotatably supported by a support shaft 21b of the first group cap, housed between the first group cap 21 and the barrier ring 22, and is urged in the opening direction by the above described barrier urging spring.

Next, the advancing and retracting operation of the zoom lens barrel 1 having the aforementioned configuration will be described.

Figure 8:
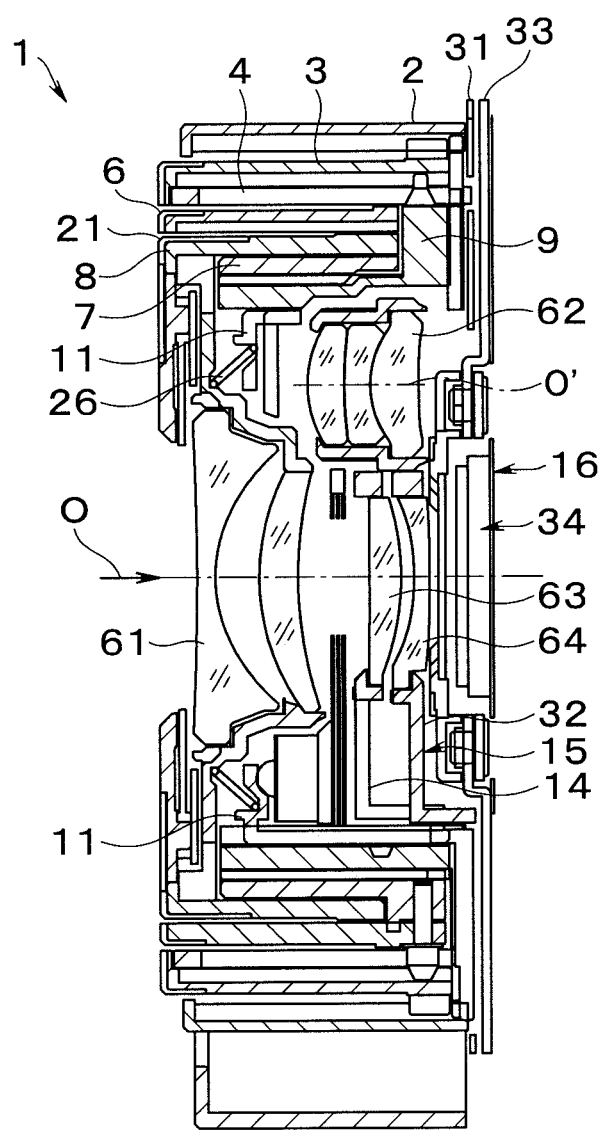
FIG. 8 is a vertical sectional view along a photographing lens optical axis in a collapsed state of the zoom lens barrel of FIG. 1.

When the zoom lens barrel 1 is in the collapsed state, the respective barrel members are drawn inside the fixed frame 2 in the overlaid state as shown in FIG. 8. In the collapsed state, the second group frame 13 is rotationally driven by the retreating cam 32a provided in the fourth group frame 32, and a second group lens 62 having an optical axis O' is retreated from a photographing optical path. Further, the lens barrier 23 provided at the distal end portion of the zoom lens barrel is also closed. Further, each of the lens groups (61, 62, 63, 64) when the zoom lens barrel 1 is in the collapsed state is in the state as shown in FIG. 19D.

Figure 9:
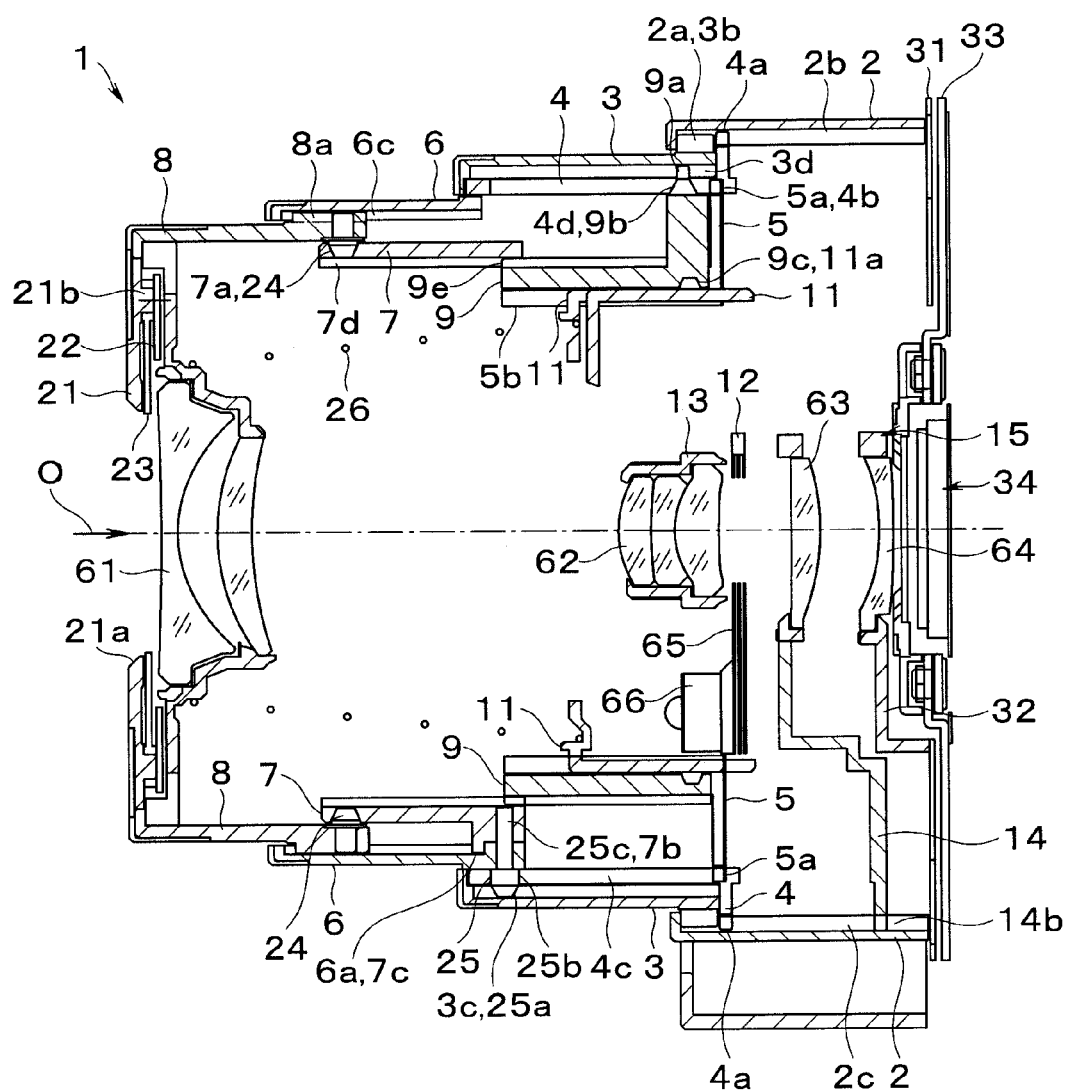
FIG. 9 is a vertical sectional view along the photographing lens optical axis in a wide state of the zoom lens barrel of FIG. 1.

When the zoom lens barrel 1 is set to the wide state capable of photographing (state of FIG. 19C) from the above described collapsed state (state of FIG. 19D), the zoom motor 41 is rotationally driven, and the rotary frame 3 is rotationally driven clockwise. The rotary frame 3 is drawn out in the direction of the optical axis O to the wide position while being rotated by the cam groove 2a (FIG. 9). At the same time, abutment of the abutment inclined surface 7e of the outer cam frame 7 which abuts on the driven arm of the barrier ring 22 is released, and the barrier blade 23 is brought into the open state by being linked to the release.

With rotation and movement of the rotary frame 3, the float key 5 moves in the direction of the optical axis O, the inner cam frame 9 moves in the direction of the optical axis O while rotating, and with the movement, the second group zoom frame 11 is drawn out to the wide position. When by drawing-out of the second group zoom frame 11, the cam follower 13b of the second group frame 13 is rotationally driven along the retreating cam 32a, and is further separated, the second group frame 13 rotates counterclockwise, and the second group lens 62 enters the photographing optical path (see FIG. 19C). Further, the shutter frame 12 moves to the position separated relatively to the rear side with respect to the second group zoom frame 11 by the urging force of the urging spring.

Meanwhile, the guide frame 6 is also drawn out with rotation and movement in the direction of the optical axis O of the rotary frame 3, and therefore, the first group zoom frame 8 is drawn out to the wide position via the outer cam frame 7 which rotates and advances and retracts. When the zoom lens barrel 1 is in the wide end (wide end position) state (state of FIG. 19C), the second group zoom frame 11 is in the position closer to the image pickup device unit 34 than the position of the first group lens 61, and the rear end surface of the inner cam frame 9 is at the rear side in the direction of the optical axis O from the rear end surface of the outer cam frame 7. The front end surface of the inner cam frame 9 is at the front side in the direction of the optical axis O from the rear end surface of the outer cam frame 7, and the front end surface of the inner cam frame 9 is between the front end surface and the rear end surface of the outer cam frame 7. Further, the front end surface of the second group zoom frame 11 is in the inner peripheral surface of the inner cam frame 9. At this time, the front end surface of the rotary frame 3 as an exterior component is forward of the front end surface of the fixed frame 2, and the rear end surface of the rotary frame 3 is inside the fixed frame 2. The front end surface of the guide frame 6 is forward of the front end surface of the rotary frame 3, and the rear end surface of the guide frame 6 is inside the rotary frame 3. The front end surface of the first group zoom frame 8 is forward of the front end surface of the guide frame 6, and the rear end surface of the first group zoom frame 8 is in the guide frame 6. These components extend in the direction of the optical axis O in the shape of a so-called bamboo shoot.

In another expression, when the lens barrel 1 is at least in a wide end state, a plurality of cylindrical frame members exposed to the exterior are in the state in which they are arranged in the optical axis direction in sequence from the subject side to the image pickup device side so that the frames have outside diameters which become gradually larger from the frame with a small outside diameter at the distal end of the lens barrel. In the wide end state, inside the lens barrel, a plurality of cylindrical frame members are in the state in which they are arranged in the optical axis direction in sequence from the subject side to the image pickup device side so that the cylindrical frame members have outside diameters which become gradually smaller from the frame with the small outside diameter at the distal end of the lens barrel.

Figure 10:
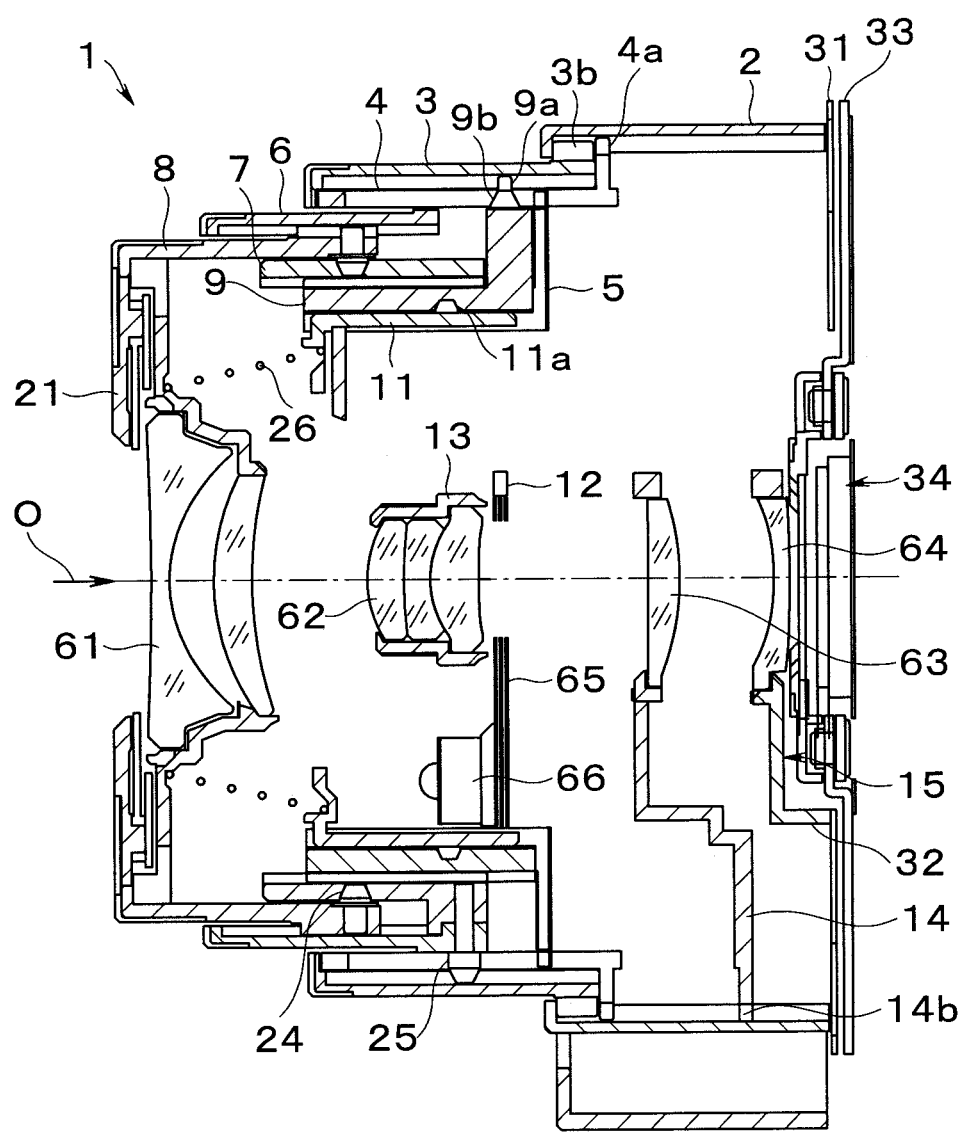
FIG. 10 is a vertical sectional view along the photographing lens optical axis in a zoom standard state of the zoom lens barrel of FIG. 1.
Figure 11:
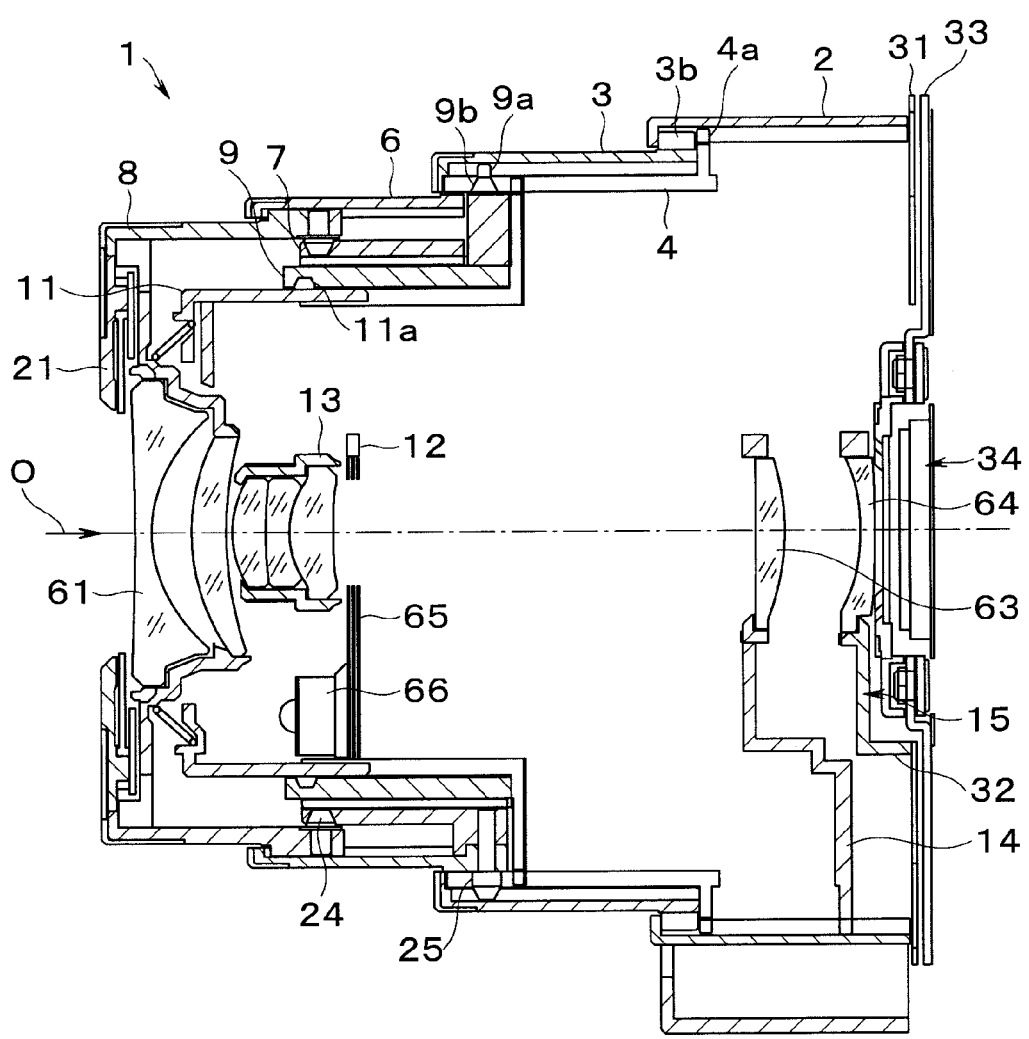
FIG. 11 is a vertical sectional view along the photographing lens optical axis in a telescopic state of the zoom lens barrel of FIG. 1.

When the zoom lens barrel 1 is brought into a zoom standard state capable of photographing (state of FIG. 19B), or brought into a telescopic state (state of FIG. 19A) after the second group zoom frame 11 and the first group zoom frame 8 reach the aforementioned wide end position capable of photographing (see FIG. 19C), the rotary frame 3 is further rotationally driven, and the second group zoom frame 11 and the first group zoom frame 8 advance and retract toward the respective zooming positions (FIGS. 10 and 11). When the zoom lens barrel 1 is in a telescopic state, the second group zoom frame 11 is at the position closer to the first group lens 61 than the position of the image pickup device unit 34 (see FIG. 19A). Further, the front end surface of the inner cam frame 9 is located at the front side in the direction of the optical axis O from the front end surface of the outer cam frame 7. The rear end surface of the inner cam frame 9 is located at the rear side in the direction of the optical axis O from the front end surface of the outer cam frame 7.

In the above described respective zoom states of the zoom lens barrel 1, the third group frame 14 is drawn out via the focus drive unit 18 by the rotational drive of the focus motor 51 so that the third group lens 63 is located at the focusing position.

In the zoom lens barrel 1 of the present embodiment, the rotary frame 3, the guide frame 6 and the first group zoom frame 8 as the exterior components extend and contract in the direction of the optical axis O in the bamboo shoot shape with respect to the fixed frame 2 in accordance with zooming, whereas the outer cam frame 7 and the inner cam frame 9 arranged inside the zoom lens barrel 1 exhibit the opposite bamboo shoot states especially between the wide state (the shortest focal length state) and the zoom standard state (substantially intermediate state between the shortest focal length state and the longest focal length state). For reference, the zoom value (focal length) of the zoom lens barrel 1 of the present embodiment is 4.7 mm to 23.5 mm.

As described above, according to the zoom lens barrel 1 of the present embodiment, the structure is adopted, in which the two cam frames that are the first group inner cam frame 9 and the second group outer cam frame 7 are fitted to each other, and are inserted and fitted between the inner side of the first group zoom frame 8 and the outer side of the second group zoom frame 11, whereby as the cam grooves, only the cam grooves 9c, 9da and 9db for the second group zoom frame 11 are provided at the inner cam frame 9, and only the cam groove 7a for the first group zoom frame 8 is provided at the outer cam frame 7, and the length in the direction of the optical axis O of each of the cam frames 9 and 7 can be made shorter. Therefore, further reduction in the length in the direction of the optical axis O of the zoom lens barrel 1 in the collapsed state can be realized.

Further, the structure is adopted, which fits the second group zoom frame 11 in the inner peripheral portion of the inner cam frame 9 in the state capable of penetrating through the inner peripheral portion in the direction of the optical axis O. Therefore, at the time of zooming, the second group zoom frame 11 can be advanced and retracted from the position extremely close to the image pickup device unit 34 to the position extremely close to the first group lens 61. In other words, such a long stroke can be adopted, that the second group zoom frame 11 advances and retracts from the position in which the rear end surface of the second group zoom frame 11 projects rearward from the rear end surface of the inner cam frame 9 to the position in which the front end surface of the second group zoom frame 11 projects forward from the front end surface of the inner cam frame 9 (FIGS. 9 and 11). Accordingly, the moving amount of the second group zoom frame 11 which moves in the lens barrel which is significantly drawn out in the direction of the optical axis O can be sufficiently secured by providing these outer and inner cam frames 7 and 9, and the high magnification zooming operation can be realized.

As above, the second group lens 62 can obtain a very large moving amount in the lens barrel.

Further, in the zoom lens barrel 1 of the present embodiment, after the zoom motor 41 is fastened to the gear case 44 by the screws, the slit plate 43 with a cutout portion is attached to the output shaft 41c by being inserted and press-fitted onto the output shaft 41c from the side. Accordingly, even if the number of blades of the slit plate 43 is large, the blades do not interfere with the above described screw-fastening operation, and the zoom motor 41 can be easily fitted.

The zoom lens barrel according to the present invention enables high magnification zooming, and therefore, can be used as a zoom lens barrel which can be further drawn out in the optical axis direction of the photographing lens in the zooming state.

The present invention is not limited to the aforementioned embodiment, and various modifications and applications can be carried out in the range without departing from the gist of the invention as a matter of course. Further, the above described embodiment includes the inventions at the various stages, and various inventions can be extracted by proper combination in a plurality of components which are disclosed. For example, even when some of the components are deleted from all the components shown in the above described one embodiment, if the problem to be solved by the invention can be solved, and the effect of the invention is obtained, the configuration from which the components are deleted can be extracted as the invention. The invention is not restricted by a specific embodiment except that the invention is limited by the accompanying claims.

What is claimed is:

1. A zoom lens barrel, comprising:
    a fixed frame;
    a rotary frame that has a first cam groove and a first rectilinearly moving groove, and rotates with respect to the fixed frame;
    a first rectilinearly moving member that has a second cam groove and a second rectilinearly moving groove, is restricted from rotating by the fixed frame, and moves in an optical axis direction with the rotary frame;
    a first cam frame that has a first cam follower which engages with and slides in contact with the first rectilinearly moving groove and the second cam groove, and a third cam groove, and rotates with the rotation of the rotary frame;
    a second rectilinearly moving member that engages with the second rectilinearly moving groove, and moves in the optical axis direction with rotation of the rotary frame;
    a third rectilinearly moving member that has a second cam follower which engages with and slides in contact with the first cam groove, and slides in contact with and engages with the second rectilinearly moving groove, and a third rectilinearly moving groove;
    a second cam frame that has a fourth cam groove, is fitted on the first cam frame, is movable in the optical axis direction with respect to the first cam frame moves, in the optical axis direction with the third rectilinearly moving member, and is provided rotatably with respect to the third rectilinearly moving member;
    rotation transmitting means that transmits rotation of the first cam frame to the second cam frame;
    a first lens frame that holds part of lenses which form a zoom lens system, has a third cam follower which engages with and slides in contact with the third cam groove, is restricted and inhibited from rotating by the second rectilinearly moving member, and moves in the optical axis direction with rotation of the first cam frame; and
    a second lens frame that holds another lens different from the lens of the zoom lens system, has a fourth cam follower which engages with and slides in contact with the fourth cam groove, and moves in the optical axis direction with rotation of the second cam frame.

2. The zoom lens barrel according to claim 1,
    wherein a cylinder section outer periphery of the rotary frame is at an inner side from a cylinder section inner periphery of the fixed frame,
    a cylinder section outer periphery of the first rectilinearly moving member is at an inner side from the cylinder section inner periphery of the rotary frame,
    a cylinder section outer periphery of the third rectilinearly moving member is at an inner side from a cylinder section inner periphery of the first rectilinearly moving member,
    a cylinder section outer periphery of the second cam frame is at an inner side of a cylinder section inner periphery of the third rectilinearly moving member, and
    a cylinder section outer periphery of the first cam frame is at an inner side of an inner periphery of the second cam frame.

3. The zoom lens barrel according to claim 2,
    wherein when the zoom lens barrel is located at a wide end position, a rear end surface of the first cam frame is rearward of a rear end surface of the second cam frame in the optical axis direction, and when the zoom lens barrel is at a telescopic position, a front end surface of the first cam frame is forward of a front end surface of the second cam frame in the optical axis direction.

4. The zoom lens barrel according to claim 1,
    wherein when the zoom lens barrel is located at a wide end position, a rear end surface of the first cam frame is rearward of a rear end surface of the second cam frame in the optical axis direction, and when the zoom lens barrel is at a telescopic position, a front end surface of the first cam frame is forward of a front end surface of the second cam frame in the optical axis direction.

* * * * *